INVENTOR.
PETER J. PLATZER
BY
Whiteley and Caine
ATTORNEYS

United States Patent Office 3,091,968
Patented June 4, 1963

3,091,968
SECTIONAL GRAIN SAMPLING PROBE
Peter J. Platzer, 2201 Essex Road, Minneapolis, Minn.
Filed May 17, 1960, Ser. No. 29,674
5 Claims. (Cl. 73—425.2)

This invention relates to improvements in a grain sampling device, and more specifically to a probe for sampling grain in bulk transit.

When grain is shipped in a conventional railway boxcar, it is necessary to obtain a representative sample of the product as a basis for determining the quality and price of the grain. The customary instrument for sampling the grain in the boxcar is a probe composed of two concentric tubes, each provided with a row of axially spaced apertures with a partition located between each of the apertures of the inner tube to define a plurality of sampling compartments. When the grain is loaded into the boxcar, the normal door openings are partially sealed with bulkheads that extend above the normal height of the grain within the car, and therefore, in taking the sample, the operator has only a limited amount of space above the bulkhead to insert the probe and obtain a desired representative sample. The probe must be of a length to extend entirely through the mass of grain, and therefore, its length makes it difficult to work in the limited space above the bulkhead.

In the present invention, I have provided a probe composed of a number of sections that may be easily joined, to facilitate the sampling of grain through the limited space provided above the bulkhead of a normal boxcar. In its simplest form, the probe is composed of a proximal or handle portion, and a distal or remote portion that may be joined to the proximal portion by a readily detachable joint. This arrangement not only facilitates the carrying and storing of the probe, but permits the operator working within the limited space above the bulkhead to first project the distal portion of the probe into the grain, and then quickly join the proximal portion thereto to sample the entire body of the grain, and to detach these portions as the probe is removed from the grain.

An object of the invention is to provide an improved grain sampling probe composed of at least two longitudinally separable portions that may be quickly joined or separated for ease in handling.

Another object is to provide a joint for connecting the sections of a double tube probe by a structure that permits relative rotation of similar tubes of separable portions of the probe.

Figure 1:
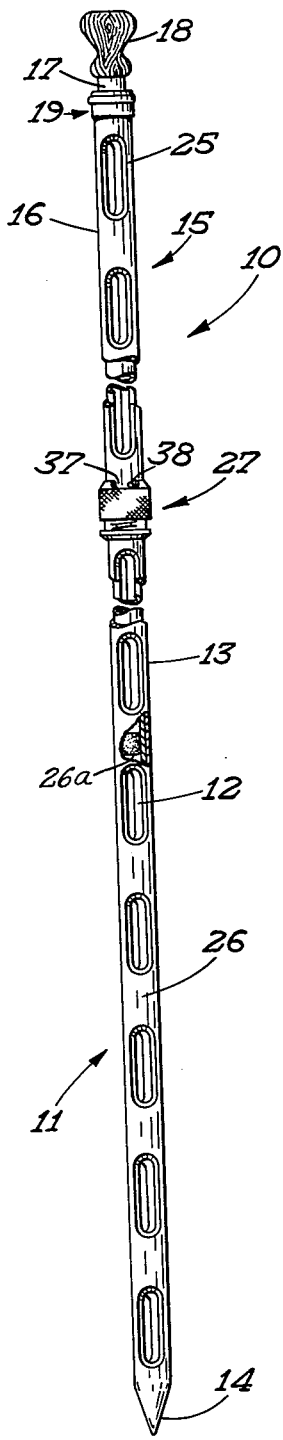
Figure 2:
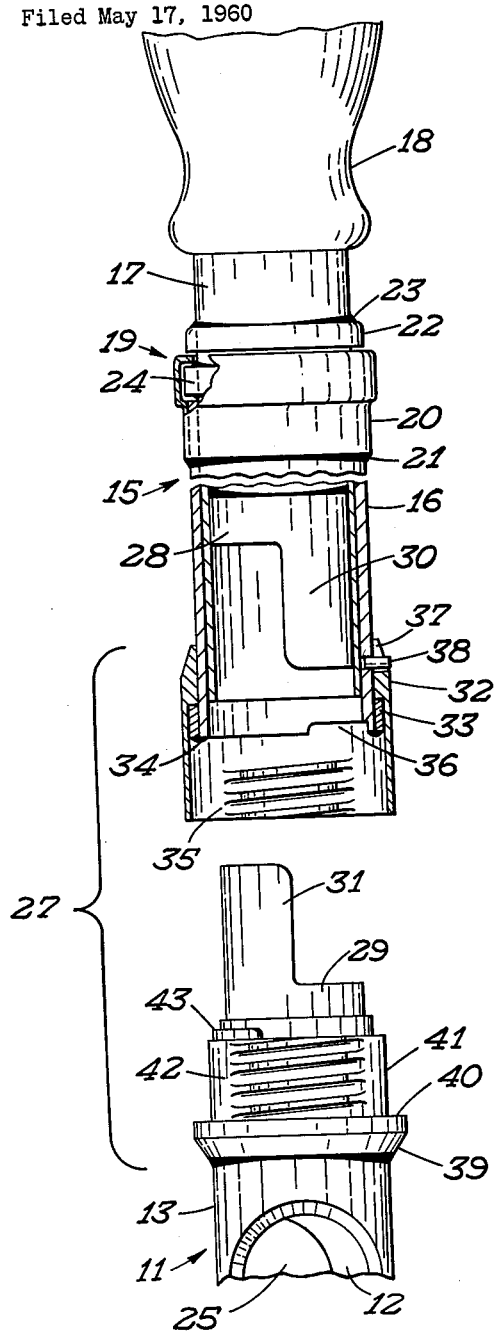

Other and further objects of the invention may become apparent from the following specification and claims, and in the appended drawing in which:

FIG. 1 is a view of an assembled grain sampling probe embodying the present invention; and, FIG. 2 is an enlarged view in section of portions of the probe seen in FIG. 1.

Referring now to the drawing, the invention will be described in detail.

In FIG. 1, general reference numeral 10 indicates a sectional probe for sampling a mass of aggregate, such as grain in a boxcar. 11 indicates a distal or remote portion of the probe composed of an inner tube 12 and an outer tube 13, the latter formed with a point 14 on the outer terminal end thereof. 15 indicates a proximal or handle portion composed of an outer tube 16 and an inner tube 17, the latter at its upper terminal end secured to a handle 18. A fitting 19 forms a joint between the outer tube 16 and the inner tube 17 of the proximal section, and as seen in FIG. 2, the fitting 19 is composed of a lower portion 20 that is soldered at 21 to the outer tube 16, and an upper portion 22 that is soldered at 23 to the inner tube 17. The members 20 and 22 are interlocked by a rotatable joint 24.

The two sets of concentric tubes are formed with longitudinally spaced apertures 25. Between the apertures 25 of the outer tubes are solid portions 26, and in alignment with said portions, the inner tubes carry plugs 26a that form a series of pockets, which may be appropriately sealed by relative axial rotation of the inner tubes with respect to the outer tubes.

The two portions 11 and 15 are united at their adjacent ends by a special joint indicated by general reference numeral 27, the parts of which are disclosed in detail in FIG. 2.

Referring now to FIG. 2, the lower compartment of the inner tube 17 of the proximal portion 15 carries within its interior a plug 28, which has been soldered within the tube, and the upper compartment of the inner tube 12 of the distal portion 11 carries within its interior a plug 29, which, likewise, has been soldered within the tube. These plugs each have a tang indicated at 30 and 31 respectively, which interdigitate when the tubes containing the plugs are brought together in prolongation so that rotation of the proximal inner tube 17 causes rotation of the distal inner tube 12.

The outer tubes are joined by a union composed of an annular member 32, which has rotative movement on the lower end of the upper outer tube 16, on a ring 33 that has been welded or soldered to tube 16 at 34. On its inner surface, member 32 has two divided threaded surfaces, one of which is indicated at 35. The threads 35 occur on opposite inner sides of the member 32, and each set of threads extends through about one-fourth of the inner surface of member 32. Member 32 also carries on its inner surface an arcuate abutment 36. An arcuate slot 37 is formed in the outer surface of member 32, and a pin 38, which is secured in the surface of tube 16, projects into the slot 37 for purposes of controlling the extent of axial rotation of member 32. Rigidly secured to the upper end of the lower outer tube 13 is a male connecting member 39, which is formed with a shoulder 40, and an annular portion 41 on which are disposed on opposite sides thereof a pair of partially threaded surfaces 42 that are intended to coact with the partially threaded surfaces 35 of member 32. Above the threaded surfaces 42 is a partial abutment 43 that coacts with abutment 36.

The operation of the invention is as follows. When the operator is ready to obtain a sample of grain from a railway car, the two portions 11 and 15 of the probe 10 are separated, with the concentric tubes rotated so as to close the several openings 25 in the inner tubes, so as to seal the internal pockets. Then, the remote or distal tube is inserted in the grain above the level of the bulkhead that holds the grain within the car, and the tube is plunged into the grain until only its upper joint is above the grain level. Then the proximal portion 15 is united to the distal portion 11. This is accomplished by rotating member 32 until the pin 38 engages one end of the slot 37, which causes the separated threaded surfaces 35 to occupy positions between the separated threaded portions 42 of the lower union portion 39. The tangs of plugs 28 and 29 are interdigitated with each other to form a joint, whence a member 32 is rotated a quarter turn to bring the abutments 36 and 43 into engagement with each other to interlock the joint. Then the probe, which is now fully assembled, is pushed further through the pile of grain to the bottom of the transport container. The length of the probe will exceed the depth of the grain so that the several pockets are now laterally spaced through the pile to take a representative sample. The handle 18 is then rotated to bring the openings of the inner tubes in alignment with the openings in the outer tubes to permit grain to enter uniformly into all of the pockets of the probe, whence the handle 18 is again rotated to seal the pockets. The entire probe may then be removed from the railway car, and if needed for ease of handling, the two sections 11 and 15 may be uncoupled by a quarter turn rotation of member 32, which does not cause the pockets to be opened, but merely allows the sections of the probe to be disassembled.

As explained heretofore, the probe may be made of any desired length and may consist of several jointed sections so that a structure may be composed to sample relatively large bins of grain, in addition to boxcars. In many instances, grain is shipped in boats or barges, and it is stored in many different types of enclosures; however, with the present invention, a true representative sample may be obtained by forming a probe of several sections.

The principal advantage in the present invention resides in providing a means of more efficiently sampling large bodies of grain or other aggregate, and in a saving of time for the operator to obtain the sample. By providing the probe in several sections, the operator's work is facilitated, and the structure will permit him to enter the car and take proper representative samples at either end of the interior of the car within the small working space available above the level of the aggregate.

The invention is not limited to the exact details of the disclosure, but is defined in the terms of the appended claims.

I claim:

1. A sectional sampling probe, comprising two pairs of coaxial tubes having longitudinally spaced apertures in the walls thereof in which the inner tube of each pair is axially rotatable relative to the respective outer tube, said inner tubes having longitudinally spaced inner plugs to provide pockets in the inner tubes and means for uniting said two pairs of tubes in prolongation with each other including a first pair of members carried respectively by the adjacent ends of the inner tubes that are adapted to interdigitate with each other only when the inner tube apertures are in longitudinal alignment on relative longitudinal movement of the inner tubes, and a second pair of members carried respectively by the adjacent ends of the outer tubes and which on relative rotational movement only after the inner tubes are interdigitated interlock the outer tubes and hold the first named members in interdigitated relationship with each other, said members comprising threaded portions which are not engaged while the tubes are being interdigitated.

2. A sectional sampling probe, comprising two pairs of coaxial tubes having axially spaced longitudinally alignable apertures in which the inner tube of each pair is axially rotatable relative to the respective outer tube, and means for uniting said two pairs of tubes in end-to-end relation including a pair of engageable members carried respectively within the inner tubes adapted for axial interdigitation with each other on relative longitudinal movement when the inner tubes apertures are in longitudinal alignment, and a pair of locking members carried respectively by the outer surfaces of the outer tubes and adapted for relative rotational movement, said pair of locking members formed on their cooperating surfaces with interrupted threaded portions in nonengaging relation during longitudinal movement of said pair of engageable members and providing quick interlocking surfaces on relative rotational movement of said locking members and means limiting relative reverse rotation of one locking member relative to the tube on which it is carried whereby on attainment of such limited rotation said two pairs of tubes may be thereafter longitudinally separated.

3. In a sectional sampling probe, comprising two pairs of coaxial tubes having axially spaced longitudinally alignable apertures and in which the inner tube of each pair is rotatable relative to the respective outer tube, means for uniting said two pairs of tubes in end-to-end relation with their apertures longitudinally alignable including a pair of cylindrical members disposed respectively within the radius of the inner tubes, said members at their respective outer ends formed for axial interdigitation only when the apertures of the inner tubes are so aligned to transmit rotary motion to the inner tubes, a pair of outer locking joint members disposed respectively on the outer end surfaces of the outer tubes and adapted to interlock on relative rotational movement only after said interdigitation is effected, and abutment means carried by said outer joint members and coacting to limit the extent of said relative rotational movement to longitudinally align the apertures of the outer tubes.

4. The structure of claim 2, and abutment means carried within one outer joint member and on the extreme exterior of the other outer joint member to limit the relative rotational and axial movement of the outer joint members while uniting said two pairs of tubes.

5. In a sectional sampling probe, comprising two pairs of coaxial tubes having axially spaced longitudinally alignable apertures and in which the inner tube of each pair is rotatable relative to the respective outer tube, means for uniting said two pairs of tubes in end-to-end relation with their apertures longitudinally alignable including a pair of coacting members disposed respectively within the radius of the inner tubes, said members at their respective outer ends formed for axially interdigitation only when the apertures of the inner tubes are so aligned to transmit rotary motion to the inner tubes, a pair of outer locking joint members disposed respectively on the outer end surfaces of the outer tubes and adapted to interlock on relative rotational movement only after said interdigitation is effected, and abutment means carried by said outer joint members and coacting to limit the extent of said relative rotational movement to longitudinally align the apertures of the outer tubes.

References Cited in the file of this patent

UNITED STATES PATENTS

| 855,849 | Gray | June 4, 1907 |
| 1,078,847 | Grauenfels | Nov. 18, 1913 |
| 1,629,058 | Wilson | May 17, 1927 |
| 2,695,797 | McCarthy | Nov. 30, 1954 |